United States Patent [19]

Adcock

[11] 4,342,810
[45] Aug. 3, 1982

[54] PLASTIC CORE COMPOSITE HAVING IMPROVED IMPACT RESISTANCE

[75] Inventor: James L. Adcock, Union City, Ind.

[73] Assignee: Sheller-Globe Corporation, Toledo, Ohio

[21] Appl. No.: 246,421

[22] Filed: Mar. 23, 1981

[51] Int. Cl.$^3$ .................. B32B 7/02; B32B 15/08; B32B 25/08; B32B 25/18

[52] U.S. Cl. .................... 428/215; 428/156; 428/217; 428/412; 428/419; 428/458; 428/462; 428/517; 428/519

[58] Field of Search ............ 428/31, 215, 412, 156, 428/217, 419, 458, 462, 517, 519; 293/1

[56] References Cited

U.S. PATENT DOCUMENTS

| | | | |
|---|---|---|---|
| 3,562,089 | 2/1971 | Warnaka et al. | 428/217 |
| 3,914,482 | 10/1975 | Sawa et al. | 428/31 |
| 4,010,297 | 3/1977 | Wenrick | 428/31 |
| 4,189,942 | 2/1980 | Giezen et al. | 428/462 |
| 4,247,599 | 1/1981 | Hopper | 428/458 |
| 4,269,897 | 5/1981 | Gans et al. | 428/419 |
| 4,291,076 | 9/1981 | Katoh | 428/458 |
| 4,305,981 | 12/1981 | Muroi et al. | 428/31 |

Primary Examiner—William J. Van Balen
Attorney, Agent, or Firm—Wilson, Fraser, Barker & Clemens

[57] ABSTRACT

A plastic composite construction and process for its preparation are disclosed in which the composite comprises a plastic core or center of extended surface area. The composite includes a metallic layer on at least one face of the core and an elastomeric layer, such as of a butyl rubber, adhered to an opposite face of the core. The addition of an elastomeric layer converts the composite to an energy-absorbing construction of substantially improved impact resistance which avoids the normal cracking or spalling of the metallic layer upon impact. The present plastic composite may have an impact resistance of at least seven foot pounds at minus 30° F. The plastic composite can be used as an exterior mirror housing and the like for vehicles.

14 Claims, 4 Drawing Figures

PLASTIC CORE COMPOSITE HAVING IMPROVED IMPACT RESISTANCE

BACKGROUND OF THE INVENTION

The present plastic core composite construction has general application wherever outside exposure to the elements or inadvertent impact blows are present or possible which, singly or in combination, are apt to crack, split, spall, or otherwise rupture a plastic core or body and especially a metallic layer on the core. The composite construction accordingly can be used as a mirror shell or housing, wheel covers, bumpers and the like for automotive vehicles, snow mobiles, snowthrowers, and other like vehicles. For purposes of illustration, the invention is described particularly in connection with a mirror shell or housing.

At present a mirror shell and the like is manufactured by die casting a metal such as zinc, for example. The casting is then finished by metal plating a decorative finish on an outer side of the casting and is then fitted with a mirror structure within the casting shell. In an endeavor to reduce the manufacturing costs and the weight of many parts and attachments for vehicles, it has been proposed to replace the more expensive and heavier metal of the mirror shell with lighter weight plastic. It has been estimated that a savings of about 1.5 pounds per outside, rear view mirror is obtainable for a total weight savings of three pounds or more per vehicle for just rear view mirrors.

Unfortunately, when plastic cores are plated with metal to cover the plastic and provide a decorative, pleasing appearance, the properties of the resulting product, especially as to impact resistance, are considerably worsened. The impact resistance of the plastic core alone can be better than the impact resistance of a metal-coated plastic core. Yet, it is important to make the appearance of the plastic core attractive and still preserve the integrity of the metallic layer for customer satisfaction. Nevertheless, the impact resistance of metal-plated plastic can be so lowered by the metal layer as to cause the plastic composite to fail specifications. This has been found to be true regardless of the plastic used for the core or similar substrate.

SUMMARY OF THE INVENTION

An object of the invention is to provide a plastic core composite having improved impact resistance. Another object is to provide such a plastic core composite having a metallic layer on at least one side and an opposed elastomeric layer on another side which enables the composite to absorb the energy of impact even at extremely low temperatures without damaging any part of the composite including the metallic layer.

These and related objects are achieved by the invention which, in one form, comprises a composite construction including a central plastic core having opposed major faces of extended surface area. A metallic layer overlies at least one major face, and an elastomeric layer adheres to the other major face. The resulting composite construction has improved resistance to impact blows without cracking, spalling, splitting and the like of the metallic layer and without delamination of the composite construction.

The metallic layer may be electrodeposited on the plastic core, while the preferred elastomer is butyl rubber. The impact resistance of the resulting composite is substantially improved, for example, to three foot pounds or better at minus 30° F.

DESCRIPTION OF THE PREFERRED EMBODIMENTS

Figure 1:
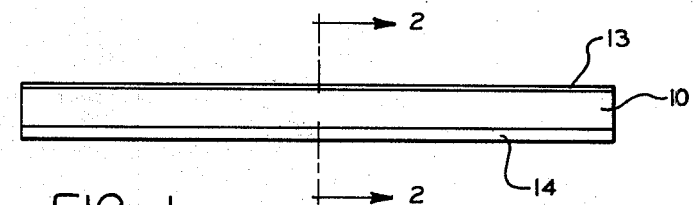
FIG. 1 is a side elevational view of a composite construction of the present invention.
Figure 2:
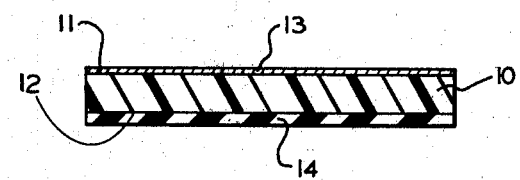
FIG. 2 is a section of FIG. 1 on the line 2—2.

FIGS. 1 and 2 illustrate a general composite construction contemplated by the present invention. In this embodiment, a central core 10 of a plastic has opposed faces or sides 11 and 12 of extended surface area. A metal layer 13 covers face 11, and an elastomeric layer 14 covers face 12.

Considering the composite in more detail, the nature of the plastic 10 is not critical to the invention and may comprise any generally known plastic or synthetic resin, whether thermosetting or thermoplastic, that may be metal plated. Examples include the polycarbonates, polyacrylates, polymethacrylates, polysulfones, polypropylene, acrylonitrile-butadiene-styrene copolymers, styrenic based polymers, nylon based polymers, blends thereof, and the like. A very satisfactory plastic is a blend of an acrylonitrile-butadiene-styrene polycarbonate blend which results in a metal-platable material with higher heat properties due to the polycarbonate modification. The plastic may be conventionally molded by any known means to any shape desired to form a body which defines the central core of the composite.

The metallic layer 13 forms a desired, decorative appearance to the plastic core 10 and is needed to achieve customer acceptance and marketability. Any metal can be used for this purpose but normally includes chromium, nickel, or copper, or alloys thereof. The metal of layer 13 can be applied by any convenient means but is usually applied by conventional electrodeposition or plating. Layer 13 can also comprise multi-coats of different metals. For example, in one electroplating operation, copper, nickel, and chromium were successively applied to plastic core 10.

In accordance with the present invention, elastic layer 14 has been found to convert the composite construction to such an energy-absorbing medium, that the composite can undergo impact blows without cracking, spalling, splitting, and the like of metallic layer 13 and without delamination or other damage to the composite construction. This becomes even more impressive at temperatures below zero degrees Fahrenheit.

While layer 14 may comprise elastomers in general, particularly improved results are obtained with a layer of butyl rubber including halobutyl rubbers, such as chlorobutyl and bromobutyl rubbers. Butyl rubbers are elastic copolymers of isobutylene and diolefins. For the present layer 14, the diolefins may have from about four to about eight carbon atoms and include, for example, isoprene, butadiene, dimethyl butadiene, and piperylene. Isoprene is preferred.

Methods for forming butyl rubbers are well known in the art and therefore are not described in detail. In general, a relatively large amount of isobutylene, for example, from about 94 to about 98 weight percent, is reacted with a relatively small amount of diolefin, for example, from about two to about six weight percent. The reaction is carried out at subzero temperatures, for instance, about minus 140° F., and may be catalyzed as by aluminum trichloride dissolved in methyl chloride. When chlorinated or brominated, the butyl rubber may contain from about 0.1% to about 10.0% by weight of the halogen.

The diolefin provides a controlled, low degree of unsaturation. Mole percent unsaturation is the number of moles of isoprene per one hundred moles of isobutylene in the copolymer. The mole percent unsaturation in the present butyl rubbers normally extends from about 0.5% to about 3.0%.

Preferably, the butyl rubber is either self-tacky or formulated to be tacky by the addition of tackifiers, fillers, modifiers, and the like. The rubber may be shaped in any form conducive to laying-up as a lamina, such as a sheet, but preferably is extruded in tape form. Preferably, the butyl rubber is flow-resistant, dimensionally stable, and capable of being cut with a blade, shears, or scissors to a desired size. The tacky nature of the rubber not only aids its adherence to plastic core 10, but cut ends of the butyl rubber readily form a satisfactory splice joint when pressed together.

Relative sizes of the laminae are not critical, and the following is given merely by way of example. Central plastic core 10 may have an average thickness of about 0.050 to about 1.0 inch. Metallic layer 13 may have an average thickness of about 0.6 to about 5.00 mils. The butyl rubber layer 14 may have an average thickness of about 0.100 to about 0.500 inch and preferably from about 0.200 to about 0.250 inch.

Normally the electrodeposition or plating operation will deposit a metal layer over all the surface areas of the core 10. In the embodiment of the invention illustrated in FIGS. 1 and 2, at least the surface 12 of the core 10 has been coated with a resist material for militating against the deposition of a metal layer thereon.

Figure 4:
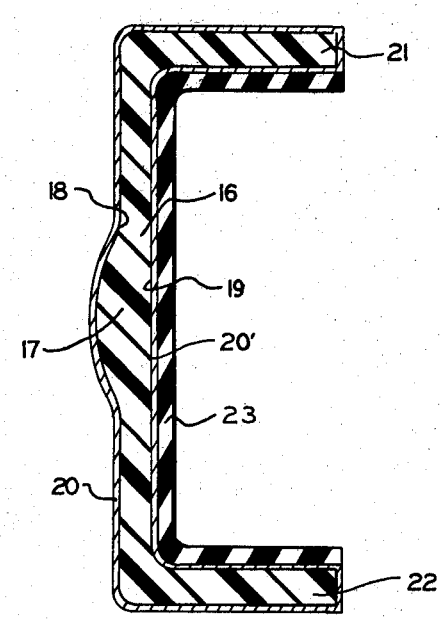
FIG. 4 is a section of FIG. 3 on the line 4—4.
Figure 3:
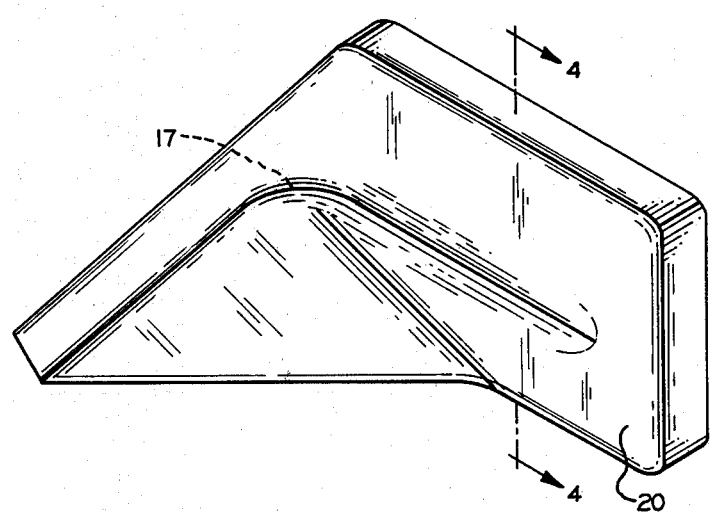
FIG. 3 is a perspective view of a mirror shell embodying the present composite construction.

FIGS. 3 and 4 illustrate the present composite construction as a utility exterior attachment in the form of a left hand, rear view mirror for an automotive vehicle. In this embodiment, the central plastic core takes the form of a U-shaped body 16 having a small central, outwardly upset bulge 17 at its bight section. This forms two opposed faces 18 and 19 of extended surface area. A metallic layer 20 and 20' completely covers both faces 18 and 19, as well as the surfaces of the legs 21 and 22, while an elastomeric layer 23 covers all of the metallic layer 20' on the face 19. It should be noted that the side opposite the anticipated impact is provided with an elastomeric layer 23. A mirror (not shown) is fitted between legs 21 and 22 of the U-shaped body and the ends of the conforming elastomeric layer 23.

In whatever form, the present composite construction has been found to have remarkably improved impact resistance. As used here and in the claims, the impact value stated is a measure of a force required to damage a test specimen when the force is applied by striking a face of the specimen with a pendulum-mounted weight of sixteen pounds. The striking surface of the weight is a hemispherical nose having a radius of 0.75 inch. The tests can be carried out at varying temperatures. Cold impact at reduced temperatures can be most severe. In carrying out a test at subzero temperatures, the test specimen is placed in a walk-in freezer at minus 30° F. and allowed to come to equilibrium for twenty-four hours prior to testing. The testing is then actually performed in the freezer itself at minus 30° F. The cold impact test is by far the most severe for a metal-plated plastic core.

The magnitude of improvement in impact resistance by the present invention is striking. Corresponding test specimens without an elastomeric layer as described consistently fail with a first blow of two foot pounds or less. Impact resistance can be doubled or tripled in accordance with the present invention and, in some instances, the impact resistance has been increased as much as eight times.

Impact resistance of a plated plastic center core is typically less than two pounds at minus 30° F. The mode of failure on most test specimens was blistering or loss of adhesion of the metal plating from the plastic core. While impact resistance of a metal plated plastic core composite without an elastomeric layer is typically less than two foot pounds at minus 30° F., a minimum impact resistance of three foot pounds at minus 30° F. is considered necessary to prevent impact damage in cold weather. Composites of the present invention absorb the energy of impact at levels in excess of three foot pounds on most mirror housing designs, and in excess of seven foot pounds on some designs at minus 30° F. without damage to the metal plate or otherwise to the composite construction. In addition, when failure does occur the damage done by impact of the plastic core lamina itself is much less severe with an elastomeric layer in place. The energy-absorbing media of the elastomeric layer appears to dissipate the energy of impact and prevent damage.

In obtaining these improved results, a tack on the elastomeric layer which enables it to adhere well with intimate contact to the plastic core contributes to the improved results. Natural glue and synthetic adhesives simply do not perform well at relatively low temperatures.

WORKING EXAMPLE

While the butyl rubber, which is preferred as the elastomeric layer, may comprise many formulations, the following is supplied as a typical example. It will also be understood that many known additives may be included, such as fillers, modifiers, colorants of all kinds, tackifiers, sealants, and the like.

| Typical Formulation | |
| --- | --- |
| Component | Parts By Weight |
| Chlorobutyl Rubber | 100 |
| Carbon Black | 30 |
| Calcium Carbonate | 45 |
| Paraffinic Oil | 45 |
| Chlorinated Paraffin Wax | 10 |
| Diethyl Thiourea | 1 |
| Liquid Polyisobutylene Polymer | 30 |
| Polybutene Resin Tackifier | 50 |

The components were mixed in an internal mixture and the temperature was raised to about 280° F. to 300° F. to provide partial cross-linking of the chlorobutyl rubber and the diethyl thiourea. The resulting butyl rubber was permanently tacky and had good dimensional stability due to the cross-linking. The butyl rubber has a tensile strength of 1100 pounds per square inch and an elongation at break of 2000%.

Although the foregoing describes several embodiments of the present invention, it is understood that the invention may be practiced in still other forms within the scope of the following claims.

I claim:

1. An improved composite construction comprising a plastic core having opposed major faces of extended surface area, a metallic layer on at least one of said major faces, and an elastomeric layer adhered to the other of said major faces, said elastomeric layer being non-flowable and dimensionally stable, and being sufficiently elastomeric at low temperatures and of sufficient extent and thickness that said composite construction has a reduced susceptibility to damage by blows to the metallic layer at minus 30° F.

2. A composite construction of claim 1 in which the plastic of said core is a polycarbonate, polyacrylate, polymethacrylate, polysulfone, polypropylene, acrylonitrile-butadiene-styrene copolymer, styrenic based polymers, nylon based polymers, or blends thereof.

3. A composite construction of claim 1 in which said metallic layer is electrodeposited on said at least one of the major faces.

4. A composite construction of claim 1 in which said elastomeric layer comprises a butyl rubber.

5. A composite construction of claim 1 in which said elastomeric layer comprises a butyl rubber prepared by copolymerizing isobutylene or a conjugated diolefin having from about 4 to about 8 carbon atoms.

6. A composite construction of claim 1 in which said elastomeric layer is a tape of tacky butyl rubber.

7. A composite construction of claim 1 in which said construction is a mirror shell.

8. An improved utility exterior attachment for a vehicle or the like, said attachment comprising an energy-absorbing composite comprising a plastic body of extended surface having a metallic layer along at least one surface thereof, and a butyl rubber layer adhered along an opposite surface thereof, said butyl rubber layer having a surface tack aiding its adherence to said opposite surface, being non-flowable and dimensionally stable, and being sufficiently elastomeric at low temperatures and of sufficient extent and thickness that said attachment has a reduced susceptability to damage by blows to the metallic layer at minus 30° F.

9. The utility exterior attachment of claim 8 in which said attachment is a mirror shell.

10. The utility exterior attachment of claim 8 in which said metallic layer is an electrodeposition of chromium, nickel, copper, or alloys thereof.

11. The utility exterior attachment of claim 8 in which said metallic layer is an electrodeposition of chromium, nickel, copper, or alloys thereof.

12. The utility exterior attachment of claim 8 in which said body has an average thickness of about 0.10 to about 1.0 inch, said metallic layer has an average thickness of about 1.50 to about 5.00 mils, and said butyl rubber layer has an average thickness of about 0.100 to about 0.500 inch.

13. A process for preparing an improved composite construction, which process comprises the steps of applying a metallic layer to at least one major face of a plastic core having opposed major faces of extended surface area, and adhering to the other of the major faces of said core a non-flowable and dimensionally stable elastomeric layer which is sufficiently elastomeric at low temperatures and of sufficient extent and thickness that said composite construction has a reduced susceptability to damage by blows to the metallic layer at minus 30° F.

14. The process of claim 13 in which said elastomeric layer comprises butyl rubber.

* * * * *